W. N. GOODWIN.
SKID.
APPLICATION FILED MAY 26, 1917.
1,251,881.
Patented Jan. 1, 1918.
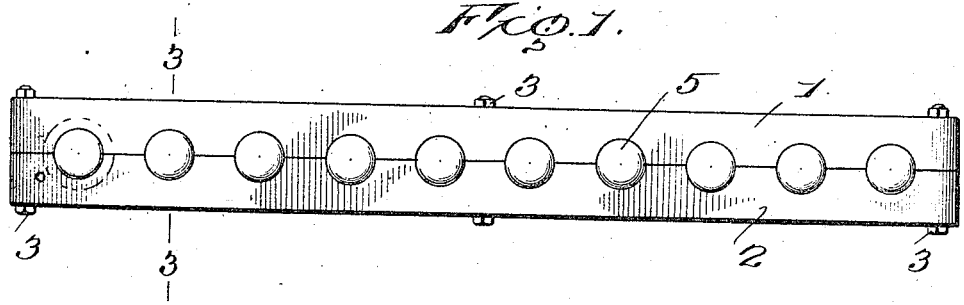
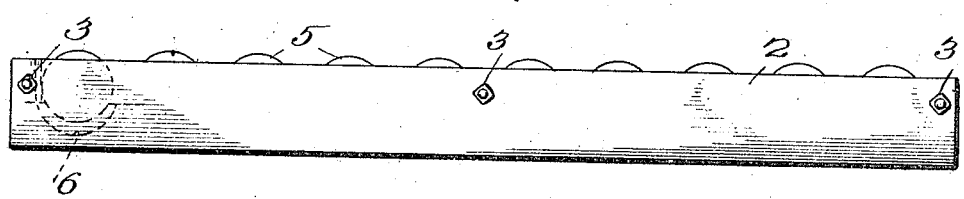
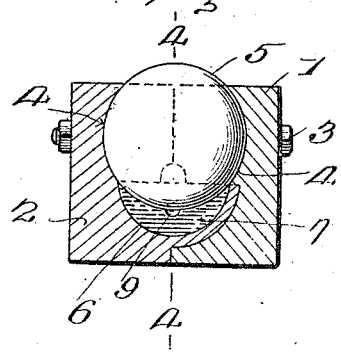
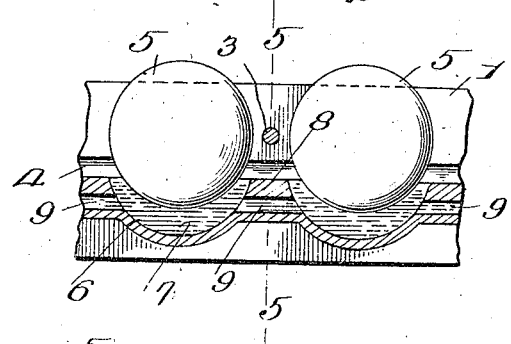
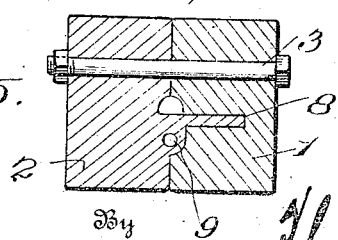
Inventor
W. N. Goodwin
By
[signature], Attorneys

UNITED STATES PATENT OFFICE.

WILLIS N. GOODWIN, OF McKENNA, WASHINGTON, ASSIGNOR OF ONE-HALF TO VALENTINE H. MAY, OF SEATTLE, WASHINGTON.

SKID.

1,251,881. Specification of Letters Patent. Patented Jan. 1, 1918.

Application filed May 26, 1917. Serial No. 171,216.

*To all whom it may concern:*

Be it known that I, WILLIS N. GOODWIN, a citizen of the United States, residing at McKenna, in the county of Pierce and State of Washington, have invented certain new and useful Improvements in Skids, of which the following is a specification.

This invention relates to skids, and has for its object the provision of a simple and inexpensive device whereby the handling of lumber and other heavy objects will be facilitated and the object being handled may be freely moved in any direction with a minimum of frictional resistance.

Incidental objects of the invention will appear as the description of the same proceeds and the novel features will be pointed out in the claims following the description.

The invention is illustrated in the accompanying drawings, in which—

Figure 1 is a plan view of a skid embodying my improvements;

Fig. 2 is a side elevation of the same;

Fig. 3 is a transverse section on the line 3—3 of Fig. 1;

Fig. 4 is a longitudinal section on the line 4—4 of Fig. 3;

Fig. 5 is a transverse section on the line 5—5 of Fig. 4.

In carrying out my invention, I employ mating members 1 and 2 which will preferably be constructed of hardened steel so as to possess the requisite durability and strength. These mating body members are secured firmly together by bolts 3 inserted transversely through them at intervals and in the upper portions of their inner opposed faces are constructed with recesses 4 adapted, when brought together, to form bearings for balls 5, as clearly shown. The bearings should be so disposed that the balls will project slightly above the tops of the body member, but will be prevented from displacement although they may rotate freely in any direction in the bearings. One of the body members 2 is constructed with cups or wells 6 in its lower portion, which cups or wells are disposed below the respective bearing chambers or recesses 4 and communicate therewith, the cups or wells being intended to receive lubricant, indicated at 7, so as to lubricate the balls, as will be readily understood on reference to Figs. 3 and 4. The body member 1 is constructed with cavities or recesses to receive the projecting portions of the cups or wells 6 and between the projecting portions of adjacent wells or cups are webs 8 which serve to reinforce the structure and also, by their engagement with the mating recesses in the body member 1, aid in holding the body members 1 and 2 in their proper relative positions. Between adjacent cups or wells, passages or conduits 9 are provided so that if lubricant be supplied to the well at one end of the body member it will flow to and feed all the wells, as will be readily understood.

My improved skid is obviously simple in its construction and will be found highly efficient in use. The parts may be very easily and quickly fitted together, and heavy timbers or other objects may be moved over the skid freely in any direction with very little labor. The lubricant will flow readily through the several cups or wells so that all the balls will be thoroughly lubricated and wear between the same and the adjacent faces of the bearings will be minimized. If desired, the faces of the bearings may be coated with Babbitt metal or other material which will impart easy running qualities to the balls.

Having thus described the invention, what is claimed as new is:

1. A skid comprising a pair of mating body members provided in their inner opposed faces with recesses forming bearings, freely movable weight-supporting devices mounted in said bearings and projecting above the body members from between the opposed meeting faces thereof, and means for securing the body members together about said bearings.

2. A skid comprising body members provided with bearings in their opposed inner faces and constructed below said bearings one with a cup and the other with a cavity to receive a part of said cup, means for securing the body members together, and freely movable weight-supporting devices mounted in said bearings and extended into said cups.

3. A skid comprising a pair of body members provided with recesses in their opposed inner faces, one of said body members having cavities below said recesses, cups upon the other body member adapted to project into said cavities, means for establishing communication between adjacent cups, freely movable weight-supporting devices fitted in the recesses and extending into said cups, and means for securing the body members together.

In testimony whereof I affix my signature.

WILLIS N. GOODWIN. [L. S.]